(12) United States Patent
Hwang et al.

(10) Patent No.: US 9,902,853 B2
(45) Date of Patent: Feb. 27, 2018

(54) COPOLYCARBONATE AND COMPOSITION COMPRISING THE SAME

(71) Applicant: LG CHEM, LTD., Seoul (KR)

(72) Inventors: Young Young Hwang, Daejeon (KR); Jung Jun Park, Daejeon (KR); Moo Ho Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/316,727

(22) PCT Filed: Dec. 3, 2015

(86) PCT No.: PCT/KR2015/013156
§ 371 (c)(1),
(2) Date: Dec. 6, 2016

(87) PCT Pub. No.: WO2016/089134
PCT Pub. Date: Jun. 9, 2016

(65) Prior Publication Data
US 2017/0190833 A1    Jul. 6, 2017

(30) Foreign Application Priority Data

Dec. 4, 2014 (KR) .......... 10-2014-0173005
Dec. 2, 2015 (KR) .......... 10-2015-0170792

(51) Int. Cl.
| | |
|---|---|
| *C08G 63/02* | (2006.01) |
| *C08L 69/00* | (2006.01) |
| *C08G 64/18* | (2006.01) |
| *C08G 64/38* | (2006.01) |
| *C08G 77/448* | (2006.01) |
| *C08J 5/00* | (2006.01) |
| *C08G 64/16* | (2006.01) |
| *C08G 64/06* | (2006.01) |
| *C08G 64/30* | (2006.01) |
| *C08G 64/08* | (2006.01) |
| *C08K 5/3475* | (2006.01) |
| *C08L 83/04* | (2006.01) |
| *C08G 64/24* | (2006.01) |
| *C08L 83/10* | (2006.01) |
| *C08K 5/00* | (2006.01) |
| *C08G 64/22* | (2006.01) |
| *C08G 77/14* | (2006.01) |
| *C08L 83/06* | (2006.01) |

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/448* (2013.01); *C08J 5/00* (2013.01); *C08K 5/005* (2013.01); *C08K 5/3475* (2013.01); *C08L 69/005* (2013.01); *C08L 83/04* (2013.01); *C08L 83/06* (2013.01); *C08L 83/10* (2013.01); *C08L 2201/08* (2013.01); *C08L 2201/10* (2013.01); *C08L 2205/02* (2013.01); *C08L 2205/025* (2013.01); *C08L 2205/05* (2013.01); *C08L 2205/06* (2013.01)

(58) Field of Classification Search
CPC ....................................................... C08L 69/00
USPC ........................................................... 528/10
See application file for complete search history.

(56) References Cited

U.S. PATENT DOCUMENTS

| | | |
|---|---|---|
| 3,819,744 A | 6/1974 | Buechner et al. |
| 5,137,949 A | 8/1992 | Paul et al. |
| 5,324,454 A | 6/1994 | Takata et al. |
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | König et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |

(Continued)

FOREIGN PATENT DOCUMENTS

| | | |
|---|---|---|
| CN | 101124282 A | 2/2008 |
| CN | 101585961 A | 11/2009 |

(Continued)

OTHER PUBLICATIONS

Hwang, et al.: "Production of impact strength and fluidity-improved polycarbonate and composition comprising same", Chemical Abstract for US2016/0251481A1, Mar. 24, 2016.

(Continued)

*Primary Examiner* — Terressa Boykin
(74) *Attorney, Agent, or Firm* — Dentons US LLP

(57) ABSTRACT

The present invention relates to a copolycarbonate and a composition comprising the same, and more specifically to a technique for improving flame retardance and chemical resistance while maintaining inherent impact strength and melt index of the copolycarbonate, by comprising a branched repeating unit in the copolycarbonate structure.

11 Claims, No Drawings

(56) References Cited

U.S. PATENT DOCUMENTS

| | | |
|---|---|---|
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 | 2/2016 | Park et al. |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | Derudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0271009 A1 | 10/2012 | Higaki et al. |
| 2012/0283393 A1 | 11/2012 | Ishikawa |
| 2013/0003544 A1 | 1/2013 | Wermuth et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0179843 A1 | 6/2014 | Van Der Mee et al. |
| 2014/0206802 A1 | 7/2014 | Bahn et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | Van Der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 | 12/2015 | Shishaku et al. |
| 2016/0002410 A1 | 1/2016 | Iyer et al. |
| 2016/0017102 A1 | 1/2016 | Yamada |
| 2016/0122477 A1 | 5/2016 | Rhee et al. |
| 2016/0251481 A1 | 9/2016 | Hwang et al. |
| 2016/0297926 A1 | 10/2016 | Hwang et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |

(56) References Cited

FOREIGN PATENT DOCUMENTS

| | | |
|---|---|---|
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013-066000 A1 | 5/2013 |
| WO | 2013/073709 A1 | 5/2013 |
| WO | 2013/100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

COPOLYCARBONATE AND COMPOSITION COMPRISING THE SAME

CROSS-REFERENCE TO RELATED APPLICATION(S)

This application is a National Stage Entry of International Application No. PCT/KR2015/013156, filed Dec. 3, 2015, and claims the benefit of and priority to Korean Application No. 10-2014-0173005, filed on Dec. 4, 2014, and Korean Application No. 10-2015-0170792, filed on Dec. 2, 2015, all of which are hereby incorporated by reference in their entirety for all purposes as if fully set forth herein.

TECHNICAL FIELD

The present invention relates to a copolycarbonate and a composition comprising the same, and more specifically to a technique for improving flame retardance and chemical resistance while maintaining inherent impact strength and melt index of the copolycarbonate, by comprising a branched repeating unit in the polycarbonate structure.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and flame retardance and chemical resistance are deteriorated.

In this regard, the present inventors have found that a copolycarbonate comprising a branched repeating unit as described below can improve flame retardance and chemical resistance while maintaining inherent impact strength and melt index of the copolycarbonate, and completed the present invention.

DETAILED DESCRIPTION OF THE INVENTION

Technical Problem

It is an object of the present invention to provide a copolycarbonate having improved flame retardance and chemical resistance while maintaining inherent impact strength and melt index of the copolycarbonate.

It is another object of the present invention to provide a composition comprising the above-mentioned copolycarbonate.

Technical Solution

In order to achieve the above objects, the present invention provides a copolycarbonate, which comprises repeating units represented by the following Chemical Formulae 1 to 3, and a branched repeating unit represented by the following Chemical Formula 4, wherein one or more of the repeating units represented by Chemical Formulae 1 to 3 are linked to each other via the branched repeating unit represented by Chemical Formula 4, and wherein the copolycarbonate has a weight average weight molecular weight of 1,000 to 100,000 g/mol.

[Chemical Formula 1]

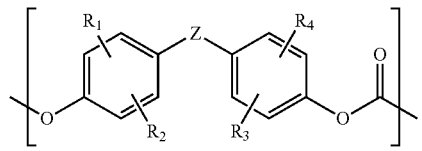

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

[Chemical Formula 2]

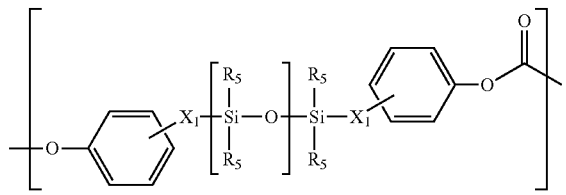

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 1 to 200,

[Chemical Formula 3]

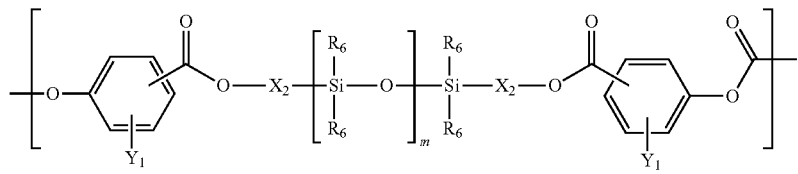

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 1 to 200,

[Chemical Formula 4]

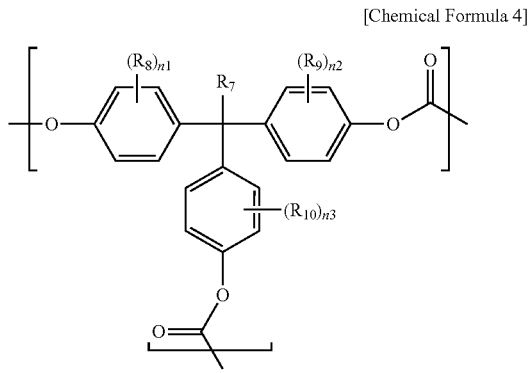

in the Chemical Formula 4, $R_7$ is hydrogen, $C_{1-10}$ alkyl, or

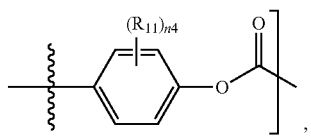

$R_8$, $R_9$, $R_{10}$ and $R_{11}$ are each independently hydrogen, $C_{1-10}$ alkyl, halogen, $C_{1-10}$ alkoxy, allyl, $C_{1-10}$ haloalkyl, or $C_{6-20}$ aryl, and n1 n2, n3 and n4 are each independently an integer of 1 to 4.

The polycarbonate is prepared by condensation-polymerization of an aromatic diol such as bisphenol A with a carbonate precursor such as phosgene and have excellent impact strength, dimensional stability, heat resistance and transparency. The polycarbonate has application in a wide range of uses, such as exterior materials of electrical and electronic products, automobile parts, building materials, and optical components. In order to improve the physical properties of the polycarbonate, a polysiloxane structure can be introduced in a main chain of the polycarbonate, thereby improving various physical properties. However, despite these improvement, the polycarbonate having an introduced polysiloxane structure must have excellent flame retardance and chemical resistance, so as to be suitable for a variety of applications. To this end, the polycarbonate can be used together with various additives, but these additives contribute to deteriorate inherent physical properties of the polycarbonate.

Thus, according to the present invention, the copolycarbonate can improve flame retardance and chemical resistance while maintaining to the maximum physical properties of the copolycarbonate, by introducing a polysiloxane structure in a main chain of the polycarbonate, and also introducing the branched repeating units as described below.

Hereinafter, the present invention will be described in detail.

Repeating Unit of Chemical Formula 1

The repeating unit represented by Chemical Formula 1 is formed by reacting an aromatic diol compound and an carbonate precursor.

In Chemical Formula 1, preferably, $R_1$, $R_2$, $R_3$ and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4 hydroxyphenyl)sulfone, bis(4-hydroxyphenyl)sulfoxide, bis (4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl) propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

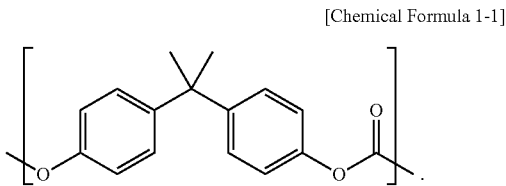

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

Repeating Unit of Chemical Formula 2 and Repeating Unit of Chemical Formula 3

In Chemical Formula 2, each of $X_1$ is independently preferably $C_{2-10}$ alkylene, more preferably $C_{2-4}$ alkylene, and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3- trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In Chemical Formula 3, each of $X_2$ is independently preferably $C_{2-10}$ alkylene, more preferably $C_{2-6}$ alkylene, and most preferably isobutylene.

Further, preferably, $Y_1$ is hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_6$ is independently $C_{1-10}$ alkyl, more preferably $C_{1-6}$ alkyl, more preferably $C_{1-3}$ alkyl, and most preferably methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, respectively, derived from a siloxane compound represented by the following Chemical Formula 2-1 and a siloxane compound represented by the following Chemical Formula 3-1:

[Chemical Formula 2-1]

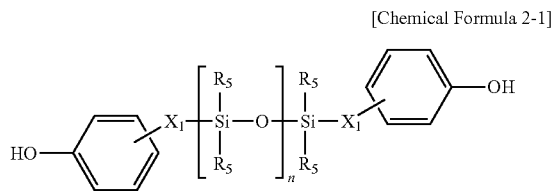

in the Chemical Formula 2-1, $X_1$, $R_5$ and n are the same as previously defined.

[Chemical Formula 3-1]

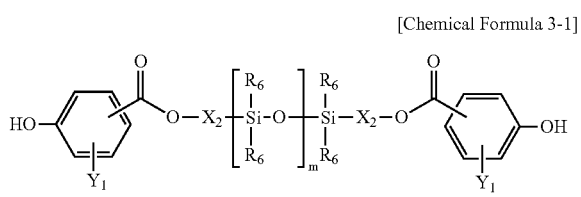

In the Chemical Formula 3-1, $X_2$, $Y_1$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively.

[Reaction Scheme 1]

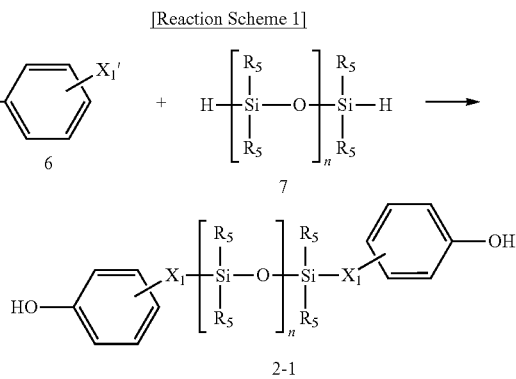

in the Reaction Scheme 1, $X_1'$ is $C_{2-10}$ alkenyl, and $X_1$, $R_5$ and n are the same as previously defined.

[Reaction Scheme 2]

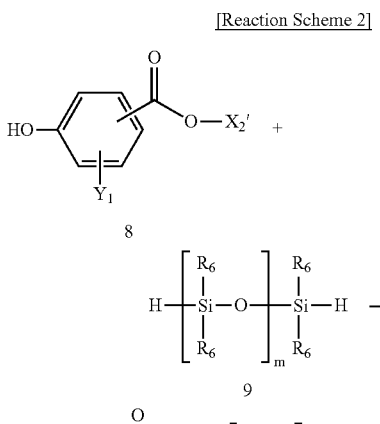

in the Reaction Scheme 2, $X_2'$ is $C_{2-10}$ alkenyl, and $X_2$, $Y_1$, $R_6$ and m are the same as previously defined.

In the Reaction Schemes 1 and 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2(COD)$, $PtCl_2$ (benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

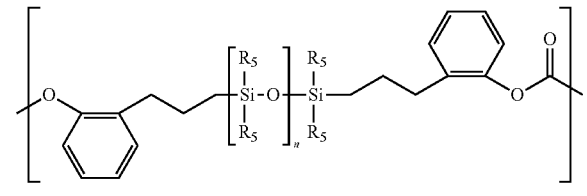

[Chemical Formula 2-2]

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

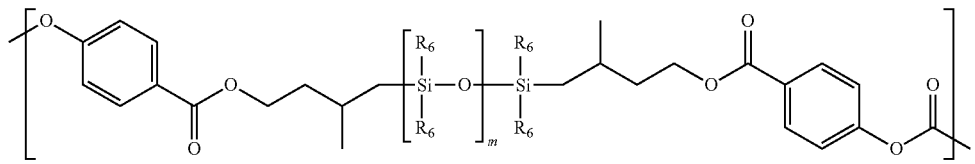

[Chemical Formula 3-2]

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane, octaphenylcyclotetrasiloxane and the like can be included.

The above organodisiloxane can be used in an amount of not less than 0.1 parts by weight, or not less than 2 parts by weight; and not more than 10 parts by weight, or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight, or not more than 3 parts by weight, based on 100 parts by weight of the organocyclosiloxane.

In particular, by adjusting the content of the repeating unit represented by Chemical Formula 2 and the repeating unit represented by Chemical Formula 3, the impact strength at low temperature and YI (Yellow Index) of the copolycarbonate can be improved simultaneously. The weight ratio between the above repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2:

in the Chemical Formula 3-2, $R_6$ and m are the same as previously defined. Preferably, $R_6$ is methyl.

Preferably, the weight ratio between the weight of the repeating unit represented by Chemical Formula 1, and the total weight of the repeating unit represented by Chemical Formula 2 and the repeating unit represented by Chemical Formula 3 (Chemical Formula 1:(Chemical Formula 2+Chemical Formula 3)) is 1:0.001 to 1:0.2, and more preferably 1:0.01 to 1:0.1. The weight ratio of the repeating units corresponds to the weight ratio of the aromatic diol compound used in the formation of the repeating unit of Chemical Formula 1 and the siloxane compound used for the formation of the repeating units of Formulae 2 and 3.

Repeating Unit of Chemical Formula 4

The copolycarbonate according to the present invention comprises a branched repeating unit as represented by Chemical Formula 4, in addition to the repeating units of Chemical Formulae 1 to 3. Thus, one or more of the repeating units represented by Chemical Formulae 1 to 3 are linked to each other via the branched repeating unit represented by Chemical Formula 4, and the copolycarbonate has a branched structure on the main chain, and thus can improve flame retardance and chemical resistance while maintaining inherent impact strength and melt index of the copolycarbonate.

Preferably, $R_7$ is $C_{1-6}$ alkyl, or

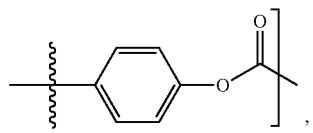 [SMILES: *c1ccc(OC(C)=O)cc1]

more preferably $C_{1-4}$ alkyl, and most preferably methyl.

Further, $R_8$, $R_9$, $R_{10}$ and $R_{11}$ are each independently preferably hydrogen, $C_{1-6}$ alkyl, or halogen, and more preferably hydrogen.

The repeating unit represented by Chemical Formula 4 is derived from an aromatic polyhydric alcohol compound represented by the following Chemical Formula 4-1:

[Chemical Formula 4-1]

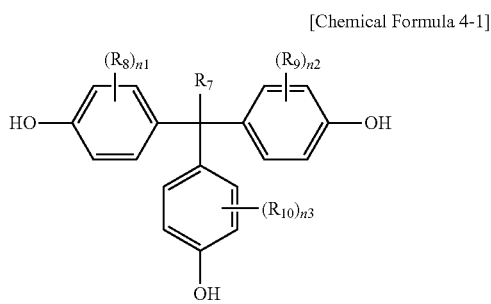

in the Chemical Formula 4-1,

R₇ is hydrogen, $C_{1-10}$ alkyl, or

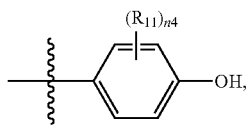

$R_8$, $R_9$, $R_{10}$, $R_{11}$, n1, n2, n3 and n4 are the same as previously defined.

As used herein, 'derived from an aromatic polyhydric alcohol compound' means that a hydroxy group of the aromatic polyhydric alcohol compound and a carbonate precursor are reacted to form the repeating unit represented by Chemical Formula 4.

For example, when an aromatic polyhydric alcohol compound is THPE (1,1,1-tris(4-hydroxyphenyl)ethane), and when it is polymerized with triphosgene, which is a carbonate precursor, the repeating unit represented by Chemical Formula 4 is represented by the following Chemical Formula 4-2:

[Chemical Formula 4-2]

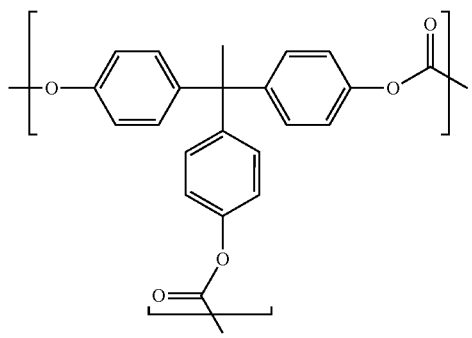

In another example, when an aromatic polyhydric alcohol compound is 4,4',4'',4'''-methanetetrayltetraphenol, and when it is polymerized with triphosgene, which is a carbonate precursor, the repeating unit represented by Chemical Formula 4 is represented by the following Chemical Formula 4-3:

[Chemical Formula 4-3]

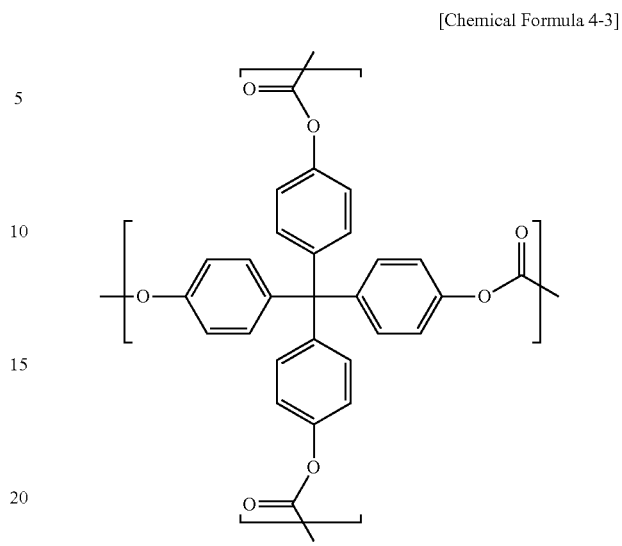

Further, the carbonate precursor that can be used for the formation of the repeating units represented by Chemical Formula 4 is the same as those described for the carbonate precursor that can be used for the formation of the repeating unit represented by Chemical Formula 1 described above.

The weight ratio between the repeating unit represented by Chemical Formula 1 and the repeating unit represented by Chemical Formula 4 is 1:0.001 to 1:0.1. Within the above range, the effects of improving physical properties is excellent. The weight ratio referred to in the above corresponds to a weight ratio of the aromatic diol compound and the aromatic polyhydric alcohol compound that are used for the formation of the repeating units of Chemical Formulae 1 to 4 described above.

Copolycarbonate

The copolycarbonate according to the present invention can be prepared by polymerizing the above-described aromatic diol compound, the aromatic polyhydric alcohol compound, the carbonate precursor and the one or more siloxane compounds.

The aromatic diol compound, the aromatic polyhydric alcohol compound, the carbonate precursor and the one or more siloxane compounds are the same as previously described. Also, the weight ratio of the respective compounds are the same as previously described.

Further, as the polymerization method, an interfacial polymerization method can be used as one example. In this case, there is an advantage in that the polymerization reaction can be made at low temperature and atmospheric pressure and it is easy to adjust the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The add binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene can be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; or and more than 10 parts by weight, not more than 6 parts by weight, or not more than 5 parts by weight, based on 100 parts by weight of the aromatic diol compound. Within this range, the required molecular weight can be obtained.

Preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

Polycarbonate Composition

In addition, the present invention provides a polycarbonate composition comprising the above-mentioned copolycarbonate and polycarbonate. The copolycarbonate may be used alone, but it can be used together with the polycarbonate as needed to control the physical properties of the copolycarbonate.

The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 5:

[Chemical Formula 5]

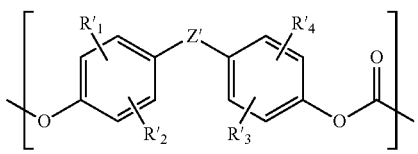

in the Chemical Formula 5, $R'_1$, $R'_2$, $R'_3$ and $R'_4$ are each independently hydrogen, $C_{1-10}$ alkyl, $C_{1-10}$ alkoxy, or halogen, $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 5 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R'_4$ and $Z'$ in Chemical Formula 5 are the same as previously described for $R_1$, $R_2$, $R_3$, $R_4$ and $Z$ in Chemical Formula 4, respectively.

Further, preferably, the repeating unit represented by Chemical Formula 5 is represented by the following Chemical Formula 5-1:

[Chemical Formula 5-1]

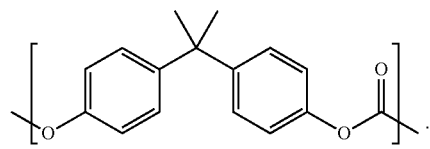

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the above-mentioned copolycarbonate or the polycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprise the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, the copolycarbonate and the composition comprising the same according to the present invention have characteristics of improving flame retardance and chemical resistance while maintaining the physical properties of the copolycarbonate to the maximum, by introducing a polysiloxane structure in a main chain of the polycarbonate and introducing a branched repeating unit in the copolycarbonate structure.

DETAILED DESCRIPTION OF THE EMBODIMENTS

Preferred embodiments will be provided below in order to assist in the understanding of the present disclosure. However, these examples are provided only for illustration of the present invention, and should not be construed as limiting the present invention to these examples.

Preparation Example 1: Preparation of Polyorganosiloxane (AP-30)

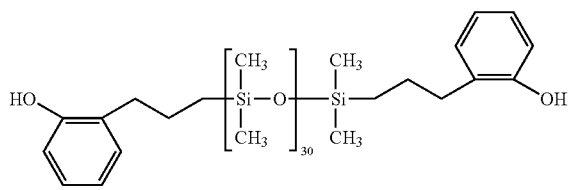

42.5 g (142.8 mmol) of octamethylcyclotetrasiloxane and 2.26 g (16.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 30 when confirmed through $^1$H NMR.

To the resulting terminal-unmodified polyorganosiloxane, 9.57 g (71.3 mmol) of 2-allylphenol and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared designated as 'AP-30'. AP-30 was pale yellow oil and the repeating unit (n) was 30 when confirmed through $^1$H NMR using Varian 500 MHz, and further purification was not required.

Preparation Example 2: Preparation of Polyorganosiloxane (MB-60)

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3) relative to 100 parts by weight of octamethylcyclotetrasiloxane; and reacted at 60° C. for 4 hours. After completion of the reaction, the reaction product was diluted with ethyl acetate and quickly filtered using a celite. The repeating unit (m) of the terminal-unmodified polyorganosiloxane thus prepared was 60 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as MB-60. MB-60 was pale yellow oil, the repeating unit (m) was 60 when confirmed through $^1$H NMR using Varian 500 MHz and further purification was not required.

Preparation Example 3

978.4 g of Bisphenol A (BPA), 620 g of NaOH 32% aqueous solution, and 7,500 g of distilled water were added to 20 L glass reactor. After confirming that BPA was completely dissolved under nitrogen atmosphere, 3,670 g of methylene chloride and 18.3 g of p-tert-butylphenol (PTBP) were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. After 10 minutes, pH was adjusted to 3 with 1N aqueous hydrochloric acid solution and then washed three times with distilled water. Subsequently, the methylene chloride phase was separated, and then precipitated in methanol to give a polycarbonate resin in the form of a powder.

Example 1

978.4 g of Bisphenol A (BPA), 3.2 g of THPE (1,1,1-tris (4-hydroxyphenyl)ethane), 1,620 g of NaOH 32% aqueous solution, and 7,500 g of distilled water were added to 20 L glass reactor. After confirming that BPA was completely dissolved under nitrogen atmosphere, 3,670 g of methylene chloride, 21.0 g of p-tert-butylphenol (PTBP), 44.16 g of polyorganosiloxane (AP-30) and 11.04 g of polyorganosiloxane (MB-60) of Preparation Example 2 were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. After 10 minutes, pH was adjusted to 3 with 1N aqueous hydrochloric acid solution and then washed three times with distilled water. Subsequently, the methylene chloride phase was separated, and

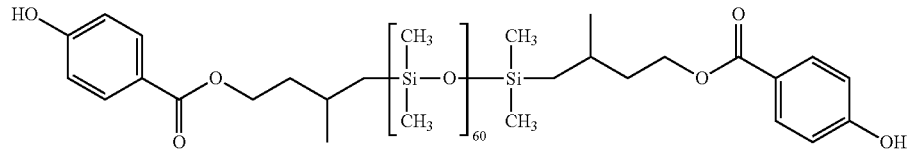

then precipitated in methanol to give a copolycarbonate resin in the form of a powder.

Example 2

The copolycarbonate resin was prepared in the same manner as in Example 1, except that 0.98 g of THPE was used.

Example 3

80 parts by weight of the copolycarbonate prepared in Example 1 and 20 parts by weight of the polycarbonate prepared in Preparation Example 3 were mixed to prepare a copolycarbonate resin composition.

Comparative Example 1

The copolycarbonate resin was prepared in the same manner as in Example 1, except that THPE was not used, and PTBP was used in an amount of 18.3 g instead of 21.0 g.

Comparative Example 2

The copolycarbonate resin was prepared in the same manner as in Example 1, except that 55.2 g of the polyorganosiloxane (AP-30) of Preparation Example 1 was used and the polyorganosiloxane (MB-60) of Preparation Example 2 was not used.

Comparative Example 3

The copolycarbonate resin was prepared in the same manner as in Example 1, except that the polyorganosiloxane (AP-30) of Preparation Example 1 and the polyorganosiloxane (MB-60) of Preparation Example 2 were not used.

Comparative Example 4

The polycarbonate resin prepared in Preparation Example 3 was used as Comparative Example 4.

The used amount of the main reactants in the examples and comparative examples are shown in Table 1 below.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| AP-30 | 44.16 g | 44.16 g | Example 1 and Preparative Example 3[1)] | 44.16 g | 55.2 g | — | — |
| MB-60 | 11.04 g | 11.04 g | | 11.04 g | — | — | — |
| BPA | 978.4 g | 978.4 g | | 978.4 g | 978.4 g | 978.4 g | 978.4 g |
| TPG | 542.5 g | 542.5 g | | 542.5 g | 542.5 g | 542.5 g | 542.5 g |
| PTBP | 21.0 g | 18.3 g | | 18.3 g | 21.0 g | 21.0 g | 18.3 g |
| THPE | 3.2 g | 0.98 g | | — | 3.2 g | 3.2 g | — |

[1)]80 parts by weight of copolycarbonate of Example 1 and 20 parts by weight of polcarbonate of Preparation Example 3

Experimental Example

With respect to 1 part by weight of the copolycarbonate or copolycarbonate composition prepared in the examples and comparative examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a Φ30 mm twin-screw extruder provided with a vent, and was injection-molded at a cylinder temperature of 300° C. and a mold temperature of 80° C. using an injection molding machine N-20C (manufactured by JSW, Ltd.) to prepare a molded specimen.

The characteristics of the above specimens were determined by the following method:

1) Weight average molecular weight (g/mol): measured by GPC using PC standard with Agilent 1200 series.

2) Impact strength at room temperature: measured at 23° C. in accordance with ASTM 0256 (⅛ inch, Notched Izod).

3) Impact strength at low-temperature: measured at −30° C. in accordance with ASTM D256 (⅛ inch, Notched Izod).

4) Melt Index (MI): measured in accordance with ASTM D1238 (conditions of 300° C. and 1.2 kg).

5) Flame retardance: The flame retardance was evaluated according to UL 94V. Specifically, five retardant specimens with a thickness of 3.0 mm required for the application of retardant test were prepared and the evaluation was conducted according to the following procedure.

First, a 20 mm high flame was applied to the specimen for 10 seconds and then the combustion time (t1) of the specimen was measured, and the combustion process was recorded. Then, if burning ceases after the first flame application, the flame is reapplied for an additional 10 seconds. The combustion time (t1) and the glowing time (t3) were measured and the combustion process was recorded. These were similarly applied to the five specimens and the evaluation was conducted according to the criteria shown in Table 2 below.

TABLE 2

| Flame retardance grade | V-0 | V-1 | V-2 |
|---|---|---|---|
| Individual combustion time (t1 or t2 of individual specimens) | Below 10 secons | Below 30 seconds | Below 30 seconds |
| Total combustion time of five specimens(total sum of t1 and t2 of five specimens) | Below 50 seconds | Below 250 seconds | Below 250 seconds |
| Combustion and glowing time after second flame application(sum of t2 and t3 of individual specimens) | Below 30 seconds | Below 60 seocnds | Below 60 seocnds |

TABLE 2-continued

| Flame retardance grade | V-0 | V-1 | V-2 |
|---|---|---|---|
| Whether the specimens drip flaming particles | Not drip | Not drip | Drip |

6) Chemical resistance: The specimen (thickness: 3.2 mm) for measuring the tensile stress in accordance with ASTM D638 was prepared, and the chemical resistance was measured based on JIG Strain R1.0 in accordance with ASTM D543 (PRACTICE B).

Specifically, a cotton cloth (2 cm×2 cm) was placed on the center of each specimen at room temperature (23° C.). The time required until the destruction of each specimen occurs from a moment that 2 ml of solvent (Nivea® Aqua protect sun spray-SPF30, manufactured by Beiersdorf AG) drops on the cloth, was measured and the evaluation was conducted according to the following criteria.

⊚: 24 hours or more
○: 1 to 24 hours
Δ: 1 minute to 1 hour
x: within 1 minute

The results thus obtained are shown in Table 3 below.

TABLE 3

|  | Unit | Ex. 1 | Ex. 2 | Ex. 3 | C. Ex. 1 | C. Ex. 2 | C. Ex. 3 | C. Ex. 4 |
|---|---|---|---|---|---|---|---|---|
| Mw | g/mol | 30,100 | 29,300 | 29,800 | 29,500 | 28,900 | 28,100 | 27,500 |
| Impact strength at room temperature | J/m | 878 | 840 | 811 | 823 | 613 | 690 | 660 |
| Impact strength at low temperature | J/m | 760 | 728 | 699 | 711 | 165 | 138 | 116 |
| Melt Index | g/10 min | 10 | 12 | 11 | 11 | 11 | 12 | 14 |
| Flame retardance | — | V-0 | V-0 | V-1 | V-1 | V-1 | V-2 | V-2 |
| Chemical resistance | — | ⊚ | ○ | ○ | Δ | Δ | X | X |

The invention claimed is:

1. A copolycarbonate comprising repeating units represented by Chemical Formulae 1 to 3, and a branched repeating unit represented by Chemical Formula 4, wherein one or more of the repeating units represented by Chemical Formulae 1 to 3 are linked to each other via the branched repeating unit represented by Chemical Formula 4, and wherein the copolycarbonate has a weight average weight molecular weight of 1,000 to 100,000 g/mol:

[Chemical Formula 1]

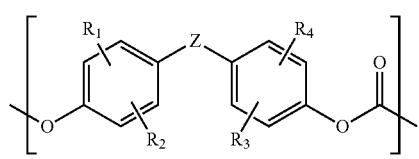

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

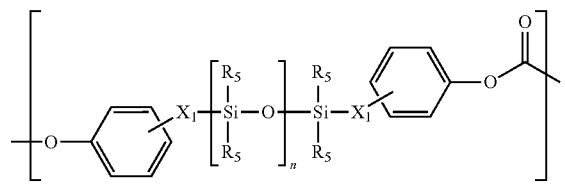

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 1 to 200,

[Chemical Formula 3]

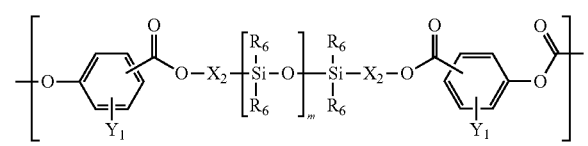

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 1 to 200,

[Chemical Formula 4]

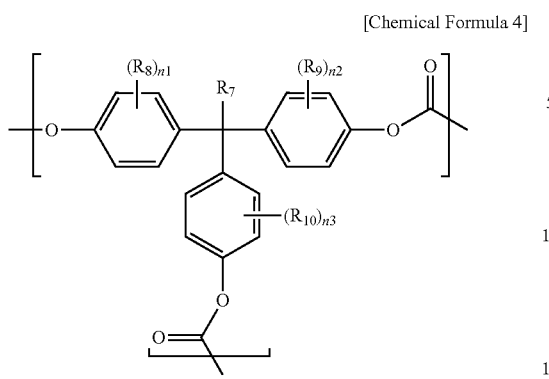

in the Chemical Formula 4,
R$_7$ is hydrogen, C$_{1-10}$ alkyl, or

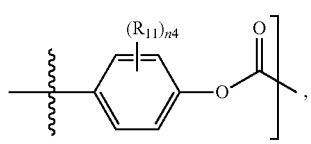

R$_8$, R$_9$, R$_{10}$ and R$_{11}$ are each independently hydrogen, C$_{1-10}$ alkyl, halogen, C$_{1-10}$ alkoxy; allyl; C$_{1-10}$ haloalkyl; or C$_{6-20}$ aryl, and n1, n2, n3 and n4 are each independently an integer of 1 to 4.

2. The copolycarbonate according to claim 1, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

3. The copolycarbonate according to claim 1, wherein the repeating unit represented by Chemical Formula 1 is represented by the following Chemical Formula 1-1:

[Chemical Formula 1-1]

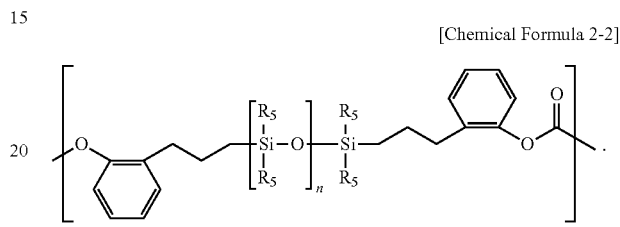

4. The copolycarbonate according to claim 1, wherein the repeating unit represented by Chemical Formula 2 is represented by the following Chemical Formula 2-2:

[Chemical Formula 2-2]

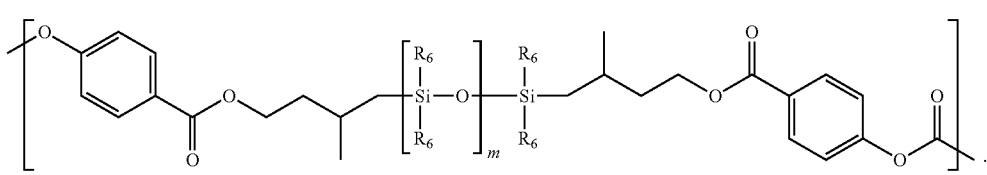

5. The copolycarbonate according to claim 1, wherein the repeating unit represented by Chemical Formula 3 is represented by the following Chemical Formula 3-2:

[Chemical Formula 3-2]

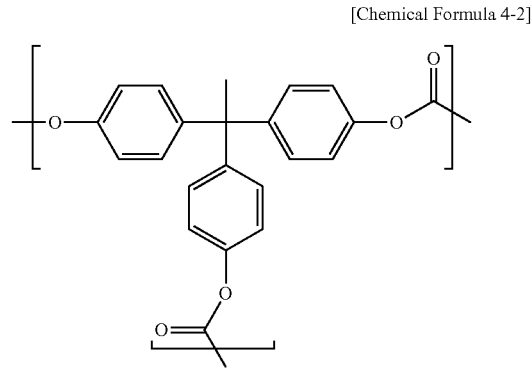

6. The copolycarbonate according to claim 1, wherein n is an integer of 10 to 35.

7. The copolycarbonate according to claim 1, wherein m is an integer of 45 to 100.

8. The copolycarbonate according to claim 1, wherein the repeating unit represented by Chemical Formula 4 is represented by the following Chemical Formula 4-2 or Chemical Formula 4-3:

[Chemical Formula 4-2]

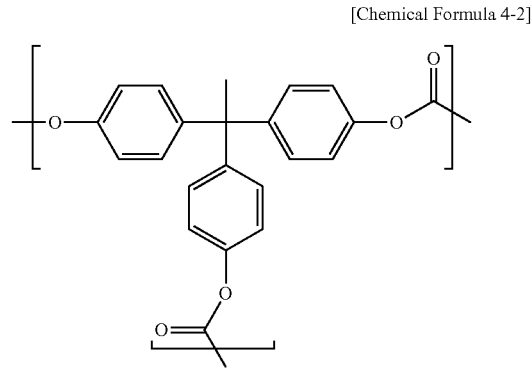

-continued

[Chemical Formula 4-3]

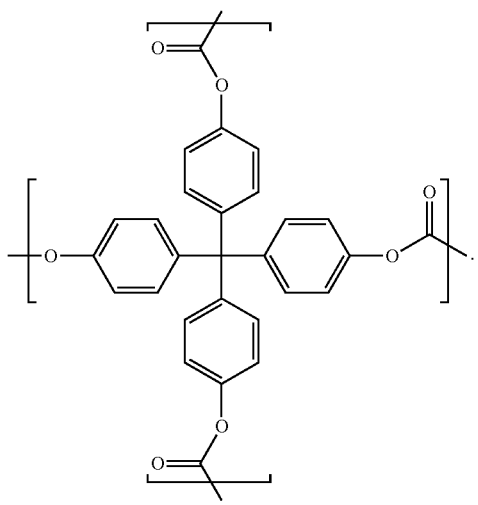

9. A polycarbonate composition comprising the copolycarbonate according to claim 1 and a polycarbonate.

10. The polycarbonate composition according to claim 9, wherein
a polysiloxane structure is not introduced in a main chain of the polycarbonate.

11. The polycarbonate composition of claim 9, wherein the polycarbonate comprises a repeating unit represented by the following Chemical Formula 5:

[Chemical Formula 5]

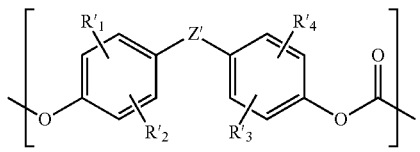

in the Chemical Formula 5, $R'_1$, $R'_2$, $R'_3$ and $R'_4$ are each independently hydrogen, $C_{1-10}$ alkyl, $C_{1-10}$ alkoxy, or halogen, $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

* * * * *